3,047,618
PROCESS FOR CONDENSING ALDEHYDES
TO ESTERS
Charles M. Selwitz, Pitcairn, and Robert A. Walde, Pittsburgh, Pa., assignors to Gulf Research & Development Company, Pittsburgh, Pa., a corporation of Delaware
No Drawing. Filed May 18, 1960, Ser. No. 29,781
12 Claims. (Cl. 260—494)

This invention relates to a process for condensing aldehydes, particularly to a process for condensing aldehydes in the presence of ketones.

Aldehydes can be condensed with themselves or with other aldehydes in the presence of aluminum alkyls. Such reaction will not proceed, however, if a ketone is present in admixture with the aldehyde to be condensed. Such mixtures can occur, for example, when an olefin is subjected to the well-known Oxo process. Thus when ethylene is reacted with carbon monoxide and hydrogen in the presence of cobalt carbonyl at elevated temperatures and pressures the product obtained contains both propionaldehyde and diethylketone. Such mixtures can also occur when an alcohol is subjected to dehydrogenation conditions. Thus when an isoamyl alcohol mixture is subjected to dehydrogenation conditions both pentanones and pentaldehydes result.

By the process of this invention aldehydes can be condensed to esters in the presence of ketones, while said ketones remain substantially unreactive. The advantages of the invention are therefore numerous. Aldehydes found in admixture with ketones can be condensed to the corresponding esters without first removing the ketone from the mixture. Ketones can be used as solvents in condensing aldehydes without adversely affecting the normal ester formation. This procedure can also be applied to the separation of aldehydes from close-boiling ketones by condensing the aldehydes to form the corresponding esters, followed by removal of the ketones by fractionation.

We have found that an aldehyde in admixture with a ketone can be condensed to the corresponding ester by employing as catalyst for said condensation reaction a compound obtained by reacting an aluminum alkyl with an aldehyde.

Aldehydes which can be condensed in accordance with the process of this invention include saturated aliphatic aldehydes having from one to 40 or more carbon atoms; unsaturated aliphatic aldehydes having from 4 to 40 or more carbon atoms and containing a double bond at least as far removed as the beta gamma position relative to the aldehyde carbonyl group; ether aldehydes from the following classes: alpha alkoxy aldehydes, gamma alkoxy aldehydes and other alkoxy aldehydes in which the ether group is at least as far removed as the gamma position relative to the aldehyde carbonyl group; aromatic aldehydes; ester aldehydes containing from 6 to 40 carbon atoms and containing an ester group at least as far removed as the gamma position relative to the aldehyde carbonyl group; acetal aldehydes containing from 6 to 40 carbon atoms and containing an acetal group at least as far removed as the gamma position relative to the aldehyde carbonyl group; halo aldehydes containing from 6 to 40 carbon atoms and containing halogen group at least as far removed as the gamma position relative to the aldehyde carbonyl group; acetylenic aldehydes containing from 6 to 40 carbon atoms and containing an acetylenic group at least as far removed as the beta-gamma position relative to the aldehyde carbonyl group; cyano aldehydes containing from 6 to 40 carbon atoms and containing a cyano group at least as far removed as the beta-gamma position relative to the aldehyde carbonyl group; dialdehydes containing from 6 to 40 carbon atoms and containing one aldehyde group at least as far removed as the beta-gamma position relative to the other aldehyde carbonyl group; alkyl thio aldehydes containing from 6 to 40 carbon atoms and containing the sulfur atom group at least as far removed as the gamma position relative to the aldehyde carbonyl group; and heterocyclic aldehydes. Examples of aldehydes which can be employed are: formaldehyde, acetaldehyde, propionaldehyde, butyraldehyde, isobutyraldehyde, cyclopropylaldehyde, cyclobutylaldehyde, cyclopentylaldehyde, cyclohexylaldehyde, 1,2,4,5-tetrahydrobenzaldehyde, cycloheptylaldehyde, cyclodecylaldehyde, 4-heptoxycycloundecylaldehyde, octylaldehyde, isooctylaldehyde, isodecylaldehyde, isovaleraldehyde, $\alpha$-methyl-n-butyraldehyde, n-valeraldehyde, methyl-n-propylacetaldehyde, caproaldehyde, enanthaldehyde, furfural, benzaldehyde, 5-methylfurfural, phenyl acetaldehyde, tolualdehyde, citronellal, cumaldehyde, anisaldehyde, ethyl $\gamma$-formalbutyrate, methyl 8-aldehydooctanoate, $\alpha$-thenaldehyde, 5-($\beta$-cyanopropyl)-docecanal, terephthaldehyde, adipic dialdehyde, 7-ethylthiododecanal, 6-octynal, 4-(2-chloroethyl)-hexanal, 3-(3-bromopropyl)-nonanal, 8-fluorodecanal, 5-iodo heptanal, quinoline-4-aldehyde, adipic dialdehyde ethylene glycol monoacetal, 8,14-diisopropoxy eicosanal, 2-oxa-cyclohexene-4-aldehyde, etc.

The aluminum alkyl which is employed in the formation of the catalyst can be defined by the following structural formula:

wherein $R_1$, $R_2$ and $R_3$, the same or different, can be an alkyl group having from one to 25 carbon atoms, preferably about one to 8 carbon atoms. Examples of aluminum alkyls which can be employed include trimethyl aluminum, triethyl aluminum, tripropyl aluminum, tri-n-butyl aluminum, triisobutyl aluminum, tri-n-pentyl aluminum, tri-n-hexyl aluminum, tri-(-3-methyl heptyl)aluminum, tridiisobutyl aluminum, methyl di-n-heptyl aluminum, ethyl propyl butyl aluminum, diethyl isobutyl aluminum, etc.

The catalyst is then formed by reacting the aluminum alkyl defined above with approximately a stoichiometric amount of an aldehyde. The aldehyde employed is preferably similar to the aldehyde to be condensed but need not be. Any of the aldehydes defined above can be employed for such purpose. The reaction can be effected in any convenient manner but preferably is effected by bringing together the aluminum alkyl and the aldehyde to be reacted therewith in approximately stoichiometric amounts at a temperature of about $-100°$ to about $100°$ C. and a pressure of about 0.01 to about 1000 pounds per square inch gauge for about one to about 1000 seconds. While we do not wish to be bound thereby we believe, although we are not certain, that the reaction leading to the catalyst to be used herein results in the addition of the aluminum alkyl across the carbonyl of the aldehyde with the resultant formation of an aluminum alkyl monoalkoxide.

The condensation reaction can be effected in any convenient manner. The aldehyde or mixture of aldehydes to be condensed are maintained at a temperature which may be, for example, about $0°$ to about $200°$ C. and a pressure of about 0.01 to about 1000 pounds per square inch gauge for about 30 seconds to about 30 hours. The amount of catalyst used, calculated as aluminum alkyl, based on the aldehyde is at least about 0.01 mol percent, preferably about 0.1 to about 10 mol percent. The ester produced in the reaction mixture can be separated therefrom in any convenient manner. For example the reaction mixture can be subjected to distillation conditions and the desired ester removed overhead. The remaining products produced and the catalyst employed are left behind in the residue.

The invention can further be illustrated by reference to the following examples.

*Example I*

To a stirred, nitrogen-blanketed solution of 103.3 grams of acetaldehyde in 186.7 grams of acetone there was added 5 cc. of triisobutyl aluminum. Although the temperature quickly rose to 7° C., it settled back to 1° C. and analysis after 30 minutes by vapor phase chromatography indicated no ethyl acetate had formed. An additional 5 cc. of triisobutyl aluminum was then added and the reaction was slowly warmed to 38° C. over a one-hour period. There was still no self sustained exothermicity and no evidence of ester formation. Finally, 5 cc. of triethyl aluminum was added to the mixture which had been cooled to 0° C. Upon warming to 12° C. over a one-hour period there was still no formation of ethyl acetate.

The above example clearly shows that an aldehyde will not condense in the presence of a ketone using an aluuminum alkyl as catalyst therefor. As further evidence thereof a total of 15 cc. of triethyl aluminum was added to a mixture of 103.3 grams of acetaldehyde and 186.7 grams of acetone and the temperature over a period of three hours was permitted to go as high as 38° C. There was no evidence of the formation of ethyl acetate.

In the examples below it can be seen that an aldehyde can be condensed to obtain an ester despite the presence of a ketone if such reaction is carried out in accordance with the procedure of this invention.

*Example II*

To 131 grams of acetaldehyde at 0° C., stirred and under a nitrogen blanket, there was added 10 cc. of triethyl aluminum. After the temperature had risen to 10° C., there was added 160 grams of acetone. The mixture spontaneously rose to 50° C. with refluxing and the acetaldehyde, over a period of one hour, was all converted to ethyl acetate.

*Example III*

To 139.6 grams of acetaldehyde at −10° C., stirred and under a nitrogen blanket, there was added 10 cc. of triethyl aluminum. After the addition of triethyl aluminum was completed, there was added 138 grams of diisopropylketone. The mixture spontaneously rose from −10° C. to 38° C. over a 103-minute period, and the acetaldehyde was all converted to ethyl acetate.

*Example IV*

To 25 milliliters of propionaldehyde under nitrogen there was added two 5-milliliter portions of triisobutyl aluminum. Temperature was kept at a maximum of 10° C. by cooling with a Dry Ice-acetone bath. The reaction mixture was stirred and kept under nitrogen over the entire reaction period. To this there was then added a mixture of 106 grams of propionaldehyde and 83 grams of diethyl ketone. The reaction was followed chromatographically as the temperature rose to 45° C. and it was found that the propionaldehyde was converted to propyl propionate.

Obviously many modifications and variations, as hereinafter set forth, can be made without departing from the spirit and scope thereof and therefore only such limitations should be employed as are indicated in the appended claims.

We claim:

1. A process for condensing aldehydes in a mixture containing a hydrocarbon aldehyde selected from the group consisting of saturated aliphatic aldehydes and aromatic aldehydes and a hydrocarbon ketone which comprises condensing such aldehydes in the presence of a catalyst obtained by reacting an aluminum trialkyl with a hydrocarbon aldehyde selected from the group consisting of saturated aliphatic aldehydes and aromatic aldehydes, said catalyst having been obtained at a temperature up to about 100° C. and a pressure up to about 1000 pounds per square inch gauge.

2. A process for condensing aldehydes in a mixture containing a hydrocarbon aldehyde selected from the group consisting of saturated aliphatic aldehydes and aromatic aldehydes and a hydrocarbon ketone which comprises condensing such aldehydes in the presence of a catalyst obtained by reacting triethyl aluminum with a hydrocarbon aldehyde selected from the group consisting of saturated aliphatic aldehydes and aromatic aldehydes, said catalyst having been obtained at a temperature up to about 100° C. and a pressure up to about 1000 pounds per square inch gauge.

3. A process for condensing aldehydes in a mixture containing a hydrocarbon aldehyde selected from the group consisting of saturated aliphatic aldehydes and aromatic aldehydes and a hydrocarbon ketone which comprises condensing such aldehydes in the presence of a catalyst obtained by reacting triisobutyl aluminum with a hydrocarbon aldehyde selected from the group consisting of saturated aliphatic aldehydes and aromatic aldehydes, said catalyst having been obtained at a temperature up to about 100° C. and a pressure up to about 1000 pounds per square inch gauge.

4. A process for condensing acetaldehyde in a mixture containing acetaldehyde and acetone which comprises condensing acetaldehyde in the presence of a catalyst obtained by reacting an aluminum trialkyl with acetaldehyde, said catalyst having been obtained at a temperature up to about 100° C. and a pressure up to about 1000 pounds per square inch gauge.

5. A process for condensing acetaldehyde in a mixture containing acetaldehyde and acetone which comprises condensing acetaldehyde in the presence of a catalyst obtained by reacting triethyl aluminum with acetaldehyde, said catalyst having been obtained at a temperature up to about 100° C. and a pressure up to about 1000 pounds per square inch gauge.

6. A process for condensing acetaldehyde in a mixture containing acetaldehyde and acetone which comprises condensing acetaldehyde in the presence of a catalyst obtained by reacting triisobutyl aluminum with acetaldehyde, said catalyst having been obtained at a temperature up to about 100° C. and a pressure up to about 1000 pounds per square inch gauge.

7. A process for condensing acetaldehyde in a mixture containing acetaldehyde and diisopropylketone which comprises condensing acetaldehyde in the presence of a catalyst obtained by reacting an aluminum trialkyl with acetaldehyde, said catalyst having been obtained at a temperature up to about 100° C. and a pressure up to about 1000 pounds per square inch gauge.

8. A process for condensing acetaldehyde in a mixture containing acetaldehyde and diisopropylketone which comprises condensing acetaldehyde in the presence of a catalyst obtained by reacting triethyl aluminum with acetaldehyde, said catalyst having been obtained at a temperature up to about 100° C. and a pressure up to about 1000 pounds per square inch gauge.

9. A process for condensing acetaldehyde in a mixture containing acetaldehyde and diisopropylketone which comprises condensing acetaldehyde in the presence of a catalyst obtained by reacting triisobutyl aluminum with acetaldehyde, said catalyst having been obtained at a temperature up to about 100° C. and a pressure up to about 1000 pounds per square inch gauge.

10. A process for condensing propionaldehyde in a mixture containing propionaldehyde and diethylketone which comprises condensing propionaldehyde in the presence of a catalyst obtained by reacting an aluminum trialkyl with propionaldehyde, said catalyst having been obtained at a temperature up to about 100° C. and a pressure up to about 1000 pounds per square inch gauge.

11. A process for condensing propionaldehyde in a mixture containing propionaldehyde and diethylketone which comprises condensing propionaldehyde in the presence of a catalyst obtained by reacting triethyl aluminum with propionaldehyde, said catalyst having been obtained at a temperature up to about 100° C. and a pressure up to about 1000 pounds per square inch gauge.

12. A process for condensing propionaldehyde in a mixture containing propionaldehyde and diethylketone which comprises condensing propionaldehyde in the presence of a catalyst obtained by reacting triisobutyl aluminum with propionaldehyde, said catalyst having been obtained at a temperature up to about 100° C. and a pressure up to about 1000 pounds per square inch gauge.

References Cited in the file of this patent

UNITED STATES PATENTS

| | | |
|---|---|---|
| 1,782,166 | Young | Dec. 16, 1930 |
| 2,345,138 | Machemer | Nov. 28, 1944 |
| 2,412,469 | Nicholl et al. | Dec. 10, 1946 |